(12) United States Patent
Yeon et al.

(10) Patent No.: US 10,706,603 B2
(45) Date of Patent: Jul. 7, 2020

(54) APPARATUS FOR EDITING GEOLOGICAL ELEMENTS USING TOUCH-BASED INTERFACE

(71) Applicant: Korea Institute Of Geoscience And Mineral Resources, Daejeon (KR)

(72) Inventors: Young Kwang Yeon, Daejeon (KR); Hee Jae Koh, Daejeon (KR); Kyo Young Song, Daejeon (KR); Seung Ryeol Lee, Daejeon (KR); Seung-bae Lee, Daejeon (KR); Paul Hong, Daejeon (KR)

(73) Assignee: Korea Institute of Geoscience and Mineral Resources, Daejeon (KR)

( * ) Notice: Subject to any disclaimer, the term of this patent is extended or adjusted under 35 U.S.C. 154(b) by 0 days.

(21) Appl. No.: 16/253,953

(22) Filed: Jan. 22, 2019

(65) Prior Publication Data
US 2019/0266769 A1    Aug. 29, 2019

(30) Foreign Application Priority Data
Feb. 23, 2018  (KR) ........................ 10-2018-0022142

(51) Int. Cl.
*G06T 11/60* (2006.01)
*G06F 3/0481* (2013.01)
(Continued)

(52) U.S. Cl.
CPC ............ *G06T 11/60* (2013.01); *G06F 3/0482* (2013.01); *G06F 3/04817* (2013.01);
(Continued)

(58) Field of Classification Search
CPC ...... G06T 11/60; G06T 11/001; G06T 11/203; G06F 3/04817; G06F 3/0482; G06F 3/04845
See application file for complete search history.

(56) References Cited

U.S. PATENT DOCUMENTS 5,517,419 A * 5/1996 Lanckton ................. G01C 7/04
348/148
2002/0010570 A1 * 1/2002 Malthe-Sorenssen .......................
G01V 1/282
703/10

(Continued)

FOREIGN PATENT DOCUMENTS

CN        107644448 A  *  1/2018
JP        2002081008 A     3/2002
(Continued)

OTHER PUBLICATIONS

Weon-Seo Kee et al., 2011, Tectonic Evolution of Upper Crustal Units in the Mid-western Part of the Korean Peninsula, Korea Institute of Geoscience and Mineral Resources, GP2009-012-01-2011(3), 255p.

(Continued)

*Primary Examiner* — Mandrita Brahmachari
(74) *Attorney, Agent, or Firm* — Harness, Dickey & Pierce, P.L.C.

(57) ABSTRACT

The present invention relates to an apparatus for editing geological elements using a touch-based interface for retrieving geological information of a survey area, thereby mapping and displaying geometric elements of points, lines, and areas. The apparatus for editing geological elements according to the present invention includes a geological symbol storage module configured to store point symbols, line symbols, and area symbols; a geographic information storage module; a geological element edit module configured, by a user's operation, to read geological information on a specific map from the geological information storage module, to read the symbols from the geological symbol storage module, to rotate the point symbols, to connect the line symbols to each other, to automatically transform the (Continued)

line symbols to area symbols, and to automatically create outlines for the area symbols; a controller; and a display module.

6 Claims, 20 Drawing Sheets

(51) Int. Cl.
    *G06F 3/0482*     (2013.01)
    *G06F 3/0484*     (2013.01)
    *G06T 11/00*     (2006.01)
    *G06T 11/20*     (2006.01)

(52) U.S. Cl.
    CPC ........ *G06F 3/04845* (2013.01); *G06T 11/001* (2013.01); *G06T 11/203* (2013.01)

(56) References Cited

U.S. PATENT DOCUMENTS

| | | | | |
|---|---|---|---|---|
| 2008/0045234 | A1* | 2/2008 | Reed | H04W 8/02 455/456.1 |
| 2010/0094548 | A1* | 4/2010 | Tadman | G01C 21/36 701/533 |
| 2012/0316847 | A1* | 12/2012 | Hantschel | G06Q 10/00 703/2 |
| 2014/0081613 | A1* | 3/2014 | Dommisse | G01V 1/345 703/10 |
| 2015/0143251 | A1* | 5/2015 | Bailiang | G06F 3/0484 715/744 |
| 2016/0125628 | A1* | 5/2016 | Barnes | G06T 17/05 345/440 |
| 2017/0219731 | A1* | 8/2017 | Eriksen | G01V 1/345 |
| 2018/0080771 | A1* | 3/2018 | Sellars | G01C 21/005 |
| 2018/0188403 | A1* | 7/2018 | Halsey | G01V 1/50 |
| 2018/0245922 | A1* | 8/2018 | Zaphir | G01C 21/04 |
| 2018/0259467 | A1* | 9/2018 | Buono | G01V 3/32 |

FOREIGN PATENT DOCUMENTS

| | | |
|---|---|---|
| KR | 20130089616 A | 8/2013 |
| KR | H101323262 B1 | 10/2013 |

OTHER PUBLICATIONS

Berque, D., Prey, J., Reed, R., 2006, Impact of Tablet PC's and Pen-based Technology on Education: Vignettes, Evaluations, and Future Directions. Purdue University Press. 200p.

Bow, J., Adlam, K. A. M., Turner, P., 2013, BGS Sigma 2012 Open Source User Guide. Edinburgh, UK, British Geological Survey, 52p.

* cited by examiner

| | Toggle | Changeover for multi-select menu |
|---|---|---|
|  | Draw Point | Input for geological structure (plane structure, line structure, etc.) and a geological element |
|  | Draw Polyline | Input for geological element having a line element such as a geological boundary, a fault, and a fold |
|  | Draw Polygon | Input for geological element having an area element of a rock lithology and the alteration area |
|  | Draw hole | Hole creation in a polygon area |
|  | Modify Geometry | Modification for a geometric element |
|  | Move | Feature moving |
|  | Cut line | Line cutting |
|  | Erase | Erasing |
|  | Feature attribute | Input and modification of a feature attribute |
|  | Undo | Undoing |
|  | Redo | Redoing |
|  | Feature Layer | Input-modification of an edit layer display and a feature attribute |
|  | Edit setting | Free hand, snapping: Edit setting - free hand, snapping |

| Attribute | Location (geometry) | Symbol application | memo |
|---|---|---|---|
| Point | | | |
| Line | | | |
| Area | | | |

•INCLINED BEDDING

| NAME | STANDARD (RATIO) |
|---|---|
| INCLINED BEDDING | |
| HORIZONTAL BEDDING | |
| VERTICAL BEDDING | |
| OVERTURNED BEDDING | |

•INCLINED JOINT

| NAME | STANDARD (RATIO) |
|---|---|
| INCLINED JOINT | |
| HORIZONTAL JOINT | |
| VERTICAL BEDDING | |

•INCLINED FOLIATION

| NAME | STANDARD (RATIO) |
|---|---|
| INCLINED FOLIATION | |
| PRIMARY FOLIATION | |
| SECONDARY FOLIATION | |
| TERTIARY FOLIATION | |
| HORIZONTAL FOLIATION | |
| VERTICAL FOLIATION | |
| DIP UNKNOWN FOLIATION | |

•INCLINED SCHISTOSITY

| NAME | STANDARD (RATIO) |
|---|---|
| INCLINED SCHISTOSITY | |
| PRIMARY SCHISTOSITY | |
| SECONDARY SCHISTOSITY | |
| TERTIARY SCHISTOSITY | |
| HORIZONTAL SCHISTOSITY | |
| VERTICAL SCHISTOSITY | |
| DIP UNKNOWN SCHISTOSITY | |

*FIG. 7*

•FLOW STRUCTURE

| NAME | STANDARD (RATIO) |
|---|---|
| FLOW STRUCTURE |  |

•INCLINDED LINEATION

| NAME | STANDARD (RATIO) |
|---|---|
| INCLINED LINEATION |  |
| PRIMARY LINEATION |  |
| SECONDARY LINEATION |  |
| TERTIARY LINEATION |  |
| EXTENDED MINERAL |  |
| PLUNGE UNKNOWN EXTENDED MINERAL |  |

•FOLD AXIS

| NAME | STANDARD (RATIO) |
|---|---|
| FOLD AXIS |  |
| SECONDARY FOLD AXIS |  |
| TERTIARY FOLD AXIS |  |

| NAME | STANDARD (RATIO) |
|---|---|
| MINOR FOLD AXIS |  |

•ORE DEPOSIT

| NAME | STANDARD (RATIO) |
|---|---|
| PLANTS FOSSIL |  |
| INVERTEBRATES FOSSIL |  |
| VERTEBRATES FOSSIL |  |
| TRACE FOSSIL |  |
| MICRO FOSSILS |  |

•FACILITY

| NAME | STANDARD (RATIO) |
|---|---|
| QUARRY | × |
| GRAVEL PIT | × |
| EARTHENWARE FACTORY |  |

*FIG. 8*

•MINE

| NAME | STANDARD (RATIO) |
|---|---|
| MINE | ⚒ |
| REST MINE | ⚒ |
| ABANDONED MINE | ✕ |
| GOAF | ✕ |
| ADIT | ⊢ |
| CLOSED ADIT | ⇄ |
| TRENCH | ⊢⊣ |
| PITHEAD | ⌒ |

•MINERAL SPRING

| NAME | STANDARD (RATIO) |
|---|---|
| MINERAL SPRING | △ |
| COLD SPRING | ⊕ |
| HOT SPRING | ♨ |

•MINERALS

| NAME | STANDARD (RATIO) |
|---|---|
| GOLD | (Au) |

•SPECIMEN

| NAME | STANDARD (RATIO) |
|---|---|
| ROCK SPECIMEN | ⊕ |
| GEOCHEMICAL ANALYSIS | ⊕ |
| DATING ROCKS | ⊕ |

•LOCATION IDENTIFIER

| NAME | STANDARD (RATIO) |
|---|---|
| OUTCROP | ✕ |
| DRILLING POINT | ◆ |
| DRILLING START POINT | ◎ |
| COAL SEAM | ∥ |

FIG. 9

•BOUNDARY LINE

| NAME | STANDARD (RATIO) |
|---|---|
| GEOLOGIC BOUNDARY | |
| INFERRED GEOLOGIC BOUNDARY | |
| GRADATIONAL GEOLOGIC BOUNDARY | |
| COAL SEAM BOUNDARY | |
| INFERRED COAL BOUNDARY | |
| ALTERATION ZONE BOUNDARY | |
| METAMORPHIC ZONE BOUNDARY | |
| SHEAR ZONE BOUNDARY | |

•FAULT

| NAME | STANDARD (RATIO) |
|---|---|
| FAULT | |

| NAME | STANDARD (RATIO) |
|---|---|
| INFERRED FAULT | |
| NORMAL FAULT | |
| INFERRED NORMAL FAULT | |
| REVERSE FAULT | |
| INFERRED REVERSE FAULT | |
| THRUST | |
| INFERRED THRUST | |
| STRIKE SLIP FAULT (SINISTRAL) | |
| INFERRED STRIKE SLIP FAULT (SINISTRAL) | |
| STRIKE SLIP FAULT (DEXTRAL) | |
| INFERRED STRIKE SLIP FAULT (DEXTRAL) | |

*FIG. 10*

•FOLD

| NAME | STANDARD (RATIO) |
|---|---|
| ANTICLINAL FOLD | |
| INFERRED ANTICLINAL FOLD | |
| OVERTURNED ISOCLINAL ANTICLINAL FOLD | |
| INFERRED OVERTURNED ISOCLINAL ANTICLINAL FOLD | |
| PLUNGING ANTICLINAL FOLD | |
| INFERRED PLUNGING ANTICLINAL FOLD | |
| RIGHT PLUNGING REVERSE ISOCLINAL ANTICLINAL FOLD | |
| INFERRED RIGHT PLUNGING REVERSE ISOCLINAL ANTICLINAL FOLD | |
| LEFT PLUNGING REVERSE ISOCLINAL ANTICLINAL FOLD | |
| INFERRED LEFT PLUNGING REVERSE ISOCLINAL ANTICLINAL FOLD | |

| NAME | STANDARD (RATIO) |
|---|---|
| SYNCLINE FOLD | |
| INFERRED SYNCLINE FOLD | |
| REVERSE ISOCLINAL SYNCLINE FOLD | |
| INFERRED REVERSE ISOCLINAL SYNCLINE FOLD | |
| PLUNGING SYNCLINE FOLD | |
| INFERRED PLUNGING SYNCLINE FOLD | |
| RIGHT PLUNGING REVERSE ISOCLINAL SYNCLINE FOLD | |
| INFERRED RIGHT PLUNGING REVERSE ISOCLINAL SYNCLINE FOLD | |
| LEFT PLUNGING REVERSE ISOCLINAL SYNCLINE FOLD | |
| INFERRED RIGHT PLUNGING REVERSE ISOCLINAL SYNCLINE FOLD | |

*FIG. 11*

• METAMORPHIC/ALTERATION ZONE
| NAME | STANDARD (RATIO) |
|---|---|
| ALTERATION ZONE | 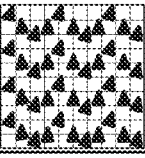 |
| METAMORPHIC ZONE | 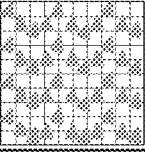 |
| SHEAR ZONE | 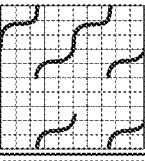 |
| FRACTURE ZONE | 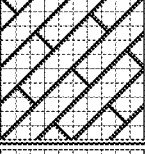 |
| MYLONITE ZONE | 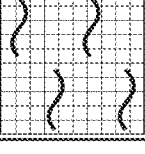 |
• ORE DEPOSIT
| NAME | STANDARD (RATIO) |
|---|---|
| COAL BED | 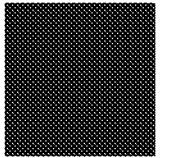 |
| ORE BODY | 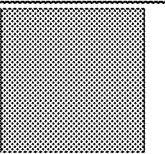 |
| SKARN ZONE | 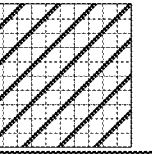 |
| MINERALIZED ZONE | 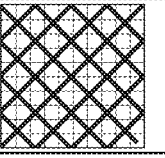 |
*FIG. 12*

APPARATUS FOR EDITING GEOLOGICAL ELEMENTS USING TOUCH-BASED INTERFACE

CROSS REFERENCE TO RELATED APPLICATION

The present application claims priority to Korean Patent Application No. 10-2018-0022142, filed Feb. 23, 2018, the entire contents of which is incorporated herein for all purposes by this reference.

BACKGROUND OF THE INVENTION

Field of the Invention

The present invention relates to an apparatus for editing geological elements using a touch-based interface and, more particularly, to an apparatus for editing geological elements using a touch-based interface for retrieving geological information of a survey area, thereby mapping and displaying geometric elements of points, lines, and areas.

Description of the Related Art

A geological map is expressed in symbols according to types of geological elements on a map by using geological elements of points, lines, and areas by analyzing a geological structure and geological phenomena observed or measured by a surveyor. The geological structure surveyed from an outcrop in the field is expressed in a form of a symbol, for which directionality of the geological structure is rotated, along with an inclined angle at a survey location. Geological boundaries, folds, faults, etc. expressed in line elements are expressed in forms of solid lines, dotted lines, etc. according to types as identified. The folds and faults are expressed in a combination of various symbols including inherent directionalities thereof according to the forms thereof. The lithology of a rock expressed in area elements may include a rock lithology pattern and is expressed in a combination of a pattern color and a background color, wherein such combination should be dynamically expressed by a user during an editing process.

For geological elements described above, it has been required to express and effectively edit various symbols in a touch-based interface such as a smart device.

DOCUMENTS OF RELATED ART

Non-Patent Documents (Non-Patent Document 1) Weon-Seo Kee et al., 2011, Tectonic Evolution of Upper Crustal Units in the Mid-western Part of the Korean Peninsula, Korea Institute of Geoscience and Mineral Resources, GP2009-012-01-2011 (3), 255 p.

(Non-Patent Document 2) Berque, D., Prey, J., Reed, R., 2006, Impact of Tablet PC's and Pen-based Technology on Education: Vignettes, Evaluations, and Future Directions. Purdue University Press. 200 p.

(Non-Patent Document 3) Bow, J., Adlam, K. A. M., Turner, P., 2013, BGS Sigma 2012 Open Source User Guide. Edinburgh, UK, British Geological Survey, 52 p.

SUMMARY OF THE INVENTION

Accordingly, the present invention has been made keeping in mind the above problems occurring in the related art, and the present invention is intended to effectively express and edit geological elements expressed in various symbol systems in a touch-based interface of a smart device, thereby ultimately allowing the geological elements in the geological survey process to be collected and collected data to be edited in a map form.

In order to achieve the above object, according to one aspect of the present invention, there is provided an apparatus for editing geological elements using a touch-based interface, the apparatus including: a geological symbol storage module configured to store point symbols, line symbols, and area symbols defined for a point, a line, and an area; a geographic information storage module configured to store geographic information to display on a map; a geological element edit module configured to provide functions, by a user's operation, of reading geological information on a specific map from the geological information storage module, of reading symbols from the geological symbol storage module of rotating the point symbols, of connecting the line symbols to each other, of automatically transforming the line symbols to the area symbols, of automatically creating outlines for the area symbols; a controller configured to map the symbols of the point, line, and area on the geographic information on the specific map read from the geographic information storage module by an operation of the geological element edit module and to output the display control signals corresponding to the mapped symbols; and a display module receiving and displaying a display control signal being input from the controller and formed with a touch panel thereon.

In an apparatus for editing geological elements using a touch-based interface composed as above according to an embodiment of the present invention, the apparatus further includes a GPS receiver receiving microwaves from a GPS satellite and generating current location information, wherein the controller may display a current location of the apparatus for editing geological elements using a touch-based interface on the geographic information read from the geographic information storage module.

In an apparatus for editing geological elements using a touch-based interface composed as above according to an embodiment of the present invention, the point symbols may be the symbols defined for an inclined bedding, an inclined joint, an inclined foliation, an inclined schistosity, a cleavage, an inclined lineation, a fold axis, a fossil, a facility, a mine, a mineral spring, a specimen, an ore deposit, and a flow structure.

In an apparatus for editing geological elements using a touch-based interface composed as above according to an embodiment of the present invention, the line symbols may be the symbols defined for a geological boundary line, a fault, and a fold.

In an apparatus for editing geological elements using a touch-based interface composed as above according to an embodiment of the present invention, the area symbols may be the symbols defined for patterns of a metamorphic/alteration zone and an ore deposit.

In an apparatus for editing geological elements using a touch-based interface composed as above according to an embodiment of the present invention, the display module may be provided with a bottom toolbar and a map edit menu screen.

In an apparatus for editing geological elements using a touch-based interface composed as above according to an embodiment of the present invention, the bottom toolbar may include a main menu button, a current location move button, a place name search button, a layer control button, a visible scale change menu button, and a toolbar button.

In an apparatus for editing geological elements using a touch-based interface composed as above according to an embodiment of the present invention, the map edit menu screen may provide: a changeover button for a multi-select menu; an input button for a geological structure and a geological element (plane structure, line structure); an input button for a geological element having a line element such as a geological boundary, a fault, and a fold; an input button for a geological element having an area element of a rock lithology and the alteration area; a button for hole creation in a polygon area; a modification button for a geometric element (point, line, and area); a button for feature moving; a button for line cutting; a button for erasing; an input and modification button for a feature attribute; a button for undoing; a button for redoing; an input-modification button for an edit layer display and a feature attribute; and a button for an edit setting (free hand, snapping).

An apparatus for editing geological elements using a touch-based interface according to an embodiment of the present invention is configured to include: a geological symbol storage module configured to store point symbols, line symbols, and area symbols defined for geometric elements of a point, a line, and an area; a geographic information storage module configured to store geographic information on a map; a geological element edit module configured to provide functions, by a user's operation, to read geological information on a specific map from the geological information storage module to read symbols from the geological symbol storage module, to rotate the point symbols, to connect the line symbols to each other, to automatically transform the line symbols to area symbols, to automatically create outlines for the area symbols; a controller configured to map the symbols of the point, line, and area on the geographic information on the specific map read from the geographic information storage module by an operation of the geological element edit module 220 and to output the display control signals corresponding to the mapped symbols; and a display module receiving and displaying a display control signal being input from the controller and formed with a touch panel thereon. Accordingly, the present invention makes it possible to effectively express and edit geological elements expressed in various symbol systems in a touch-based interface of a smart device, thereby ultimately allowing the geological elements in the geological survey process to be collected and collected data to be edited in a map form.

BRIEF DESCRIPTION OF THE DRAWINGS

The above and other objects, features and other advantages of the present invention will be more clearly understood from the following detailed description when taken in conjunction with the accompanying drawings, in which:

FIGS. 2A and 2B are views illustrating menus of an apparatus for editing geological elements using a touch-based interface according to an embodiment of the present invention, wherein FIG. 2A illustrates a main menu, and FIG. 2B illustrates an edit menu;

FIGS. 6A to 6H are views illustrating geological mapping using the apparatus of FIG. 1, wherein FIG. 6A shows a calculation of a distance and an area, FIG. 6B shows a legend for geological attributes, FIG. 6C shows a menu for a sketch (line color change and text input), FIG. 6D shows an input for plane structure-inclined bedding, FIG. 6E shows an application of a geological rock lithology pattern, FIG. 6F shows an input process for a fold-syncline fold, FIG. 6G shows a syncline fold symbol application, and FIG. 6H shows various symbol expressions;

FIG. 12 illustrates symbols of metamorphic/alteration zones and ore deposits.

DETAILED DESCRIPTION OF THE INVENTION

Figure 1:
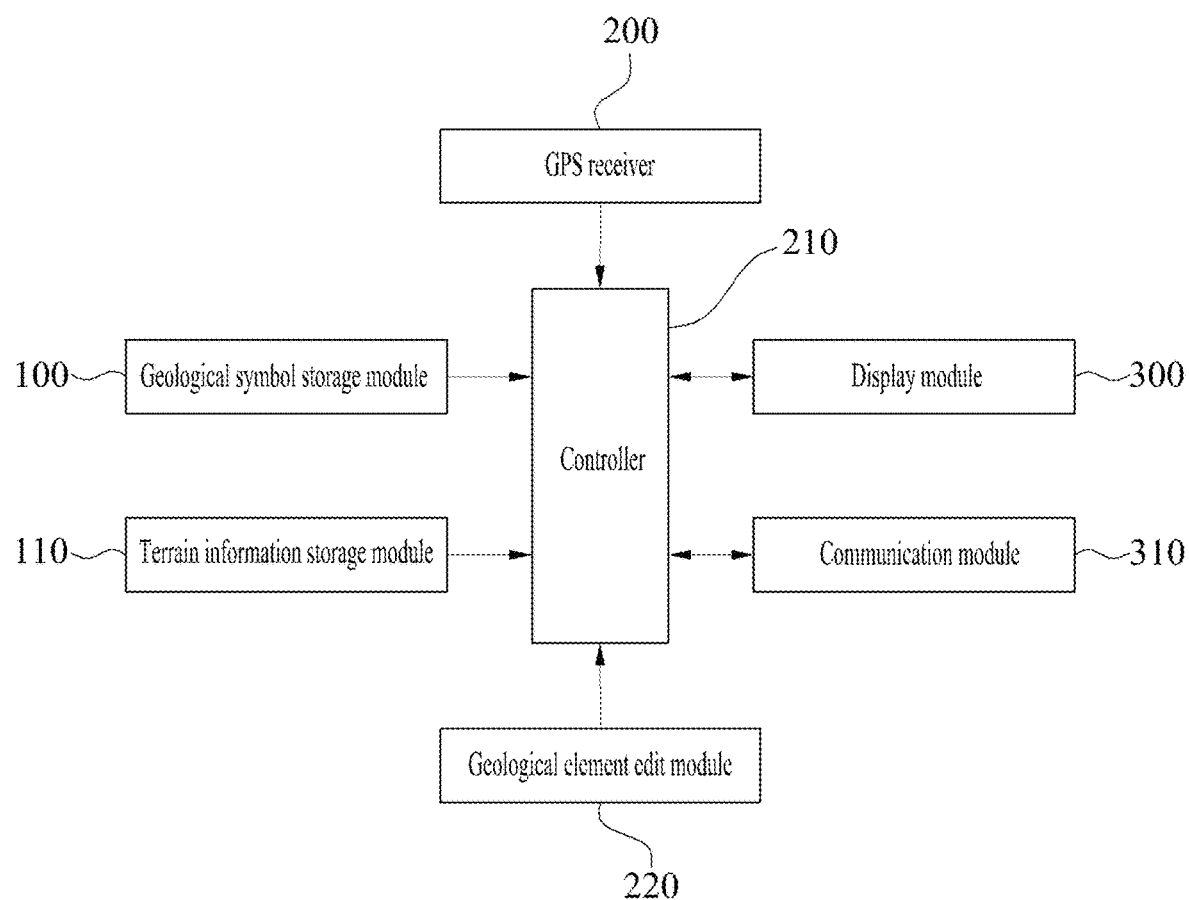
FIG. 1 is a block diagram of an apparatus for editing geological elements using a touch-based interface according to an embodiment of the present invention.
Figure 2:
Figure 3:
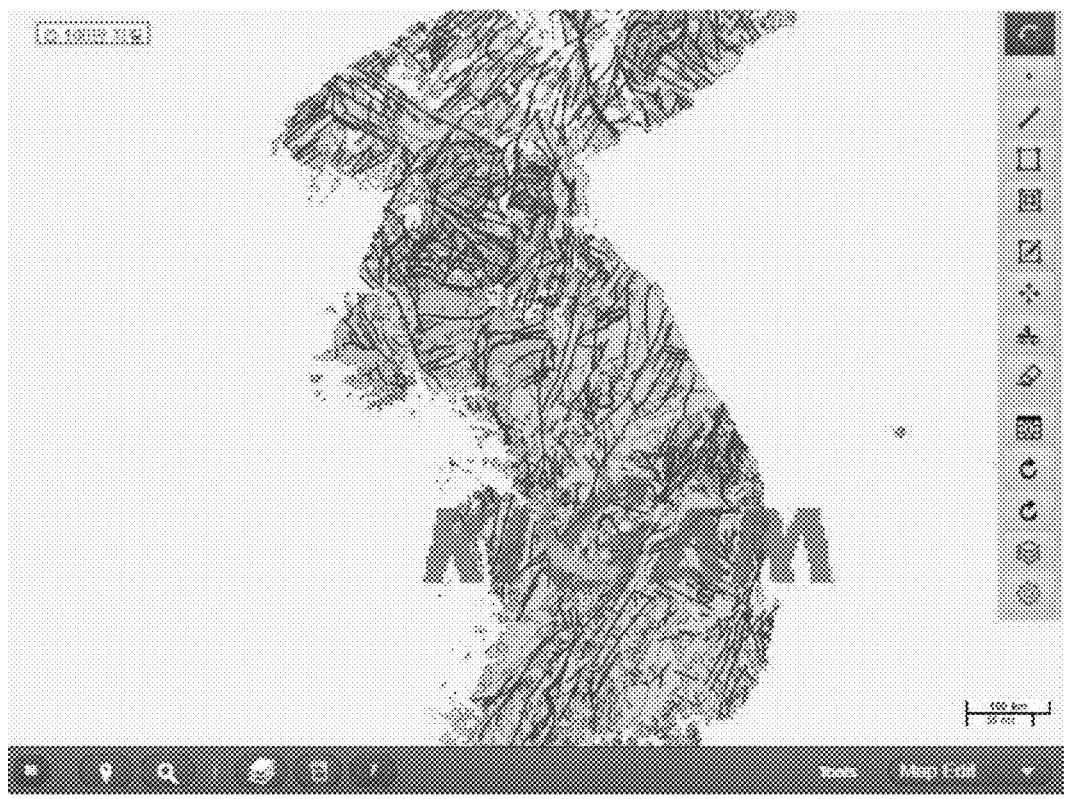
FIG. 3 is a view illustrating a structure of the edit menu in FIG. 2B.
Figure 4:
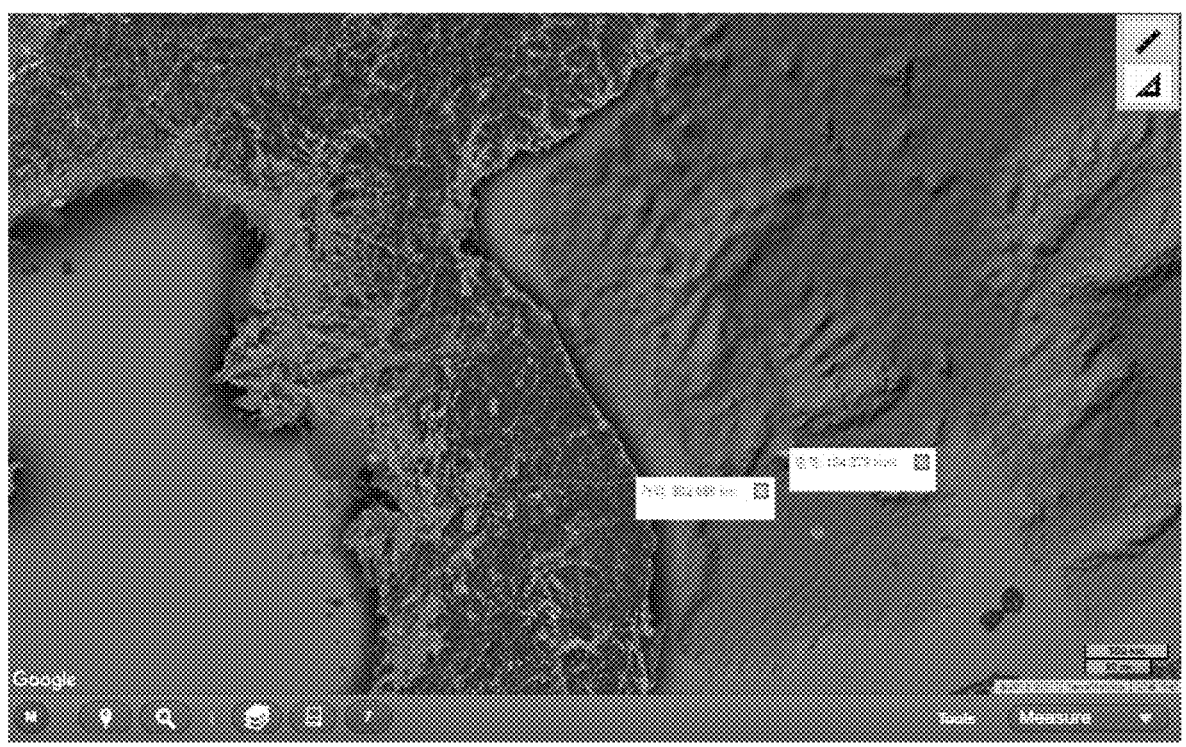
FIG. 4 shows views illustrating menu items for an outcrop survey in the apparatus of FIG. 1.
Figure 5:
FIG. 5 is a view illustrating an input format for a geometry, a symbol, and a memo with respect to elements of a point, a line, and an area in the apparatus of FIG. 1.

Hereinafter, embodiments of the present invention will be described in detail with reference to drawings. FIG. 1 is a block diagram of an apparatus for editing geological elements using a touch-based interface according to an embodiment of the present invention, FIGS. 2A and 2B are views illustrating menus of an apparatus for editing geological elements using a touch-based interface according to an embodiment of the present invention, wherein FIG. 2A illustrates a main menu, and FIG. 2B illustrates an edit menu, FIG. 3 is a view illustrating a structure of the edit menu in FIG. 2B, FIG. 4 shows views illustrating menu items for an outcrop survey in the apparatus of FIG. 1, and FIG. 5 is a view illustrating an input format for a geometry, a symbol, and a memo with respect to elements of a point, a line, and an area in the apparatus of FIG. 1

As illustrated in FIG. 1, the apparatus for editing geological elements using the touch-based interface according to an embodiment of the present invention includes a geological symbol storage module 100, a geographic information storage module 110, a geological element edit module 220, a GPS receiver 200, a controller 210, a display module 300, and a communication module 310.

The geological symbol storage module 100 plays a role of storing point symbols, line symbols, and area symbols defined for the geometric elements of points, lines, and areas. Meanwhile, the stored symbols are allowed to be read the controller 210 by the geological element edit module 220.

Figure 7:
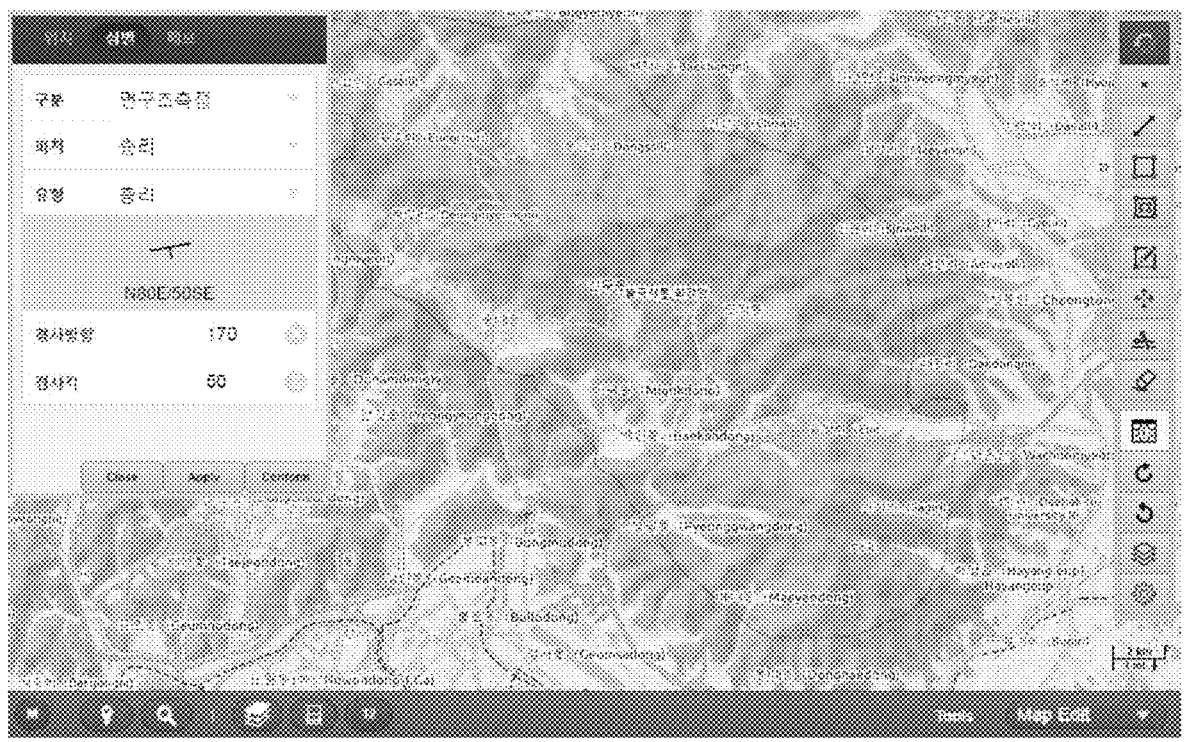
FIG. 7 illustrates symbols of inclined beddings, inclined joints, inclined foliations, and inclined schistosities.
Figure 8:
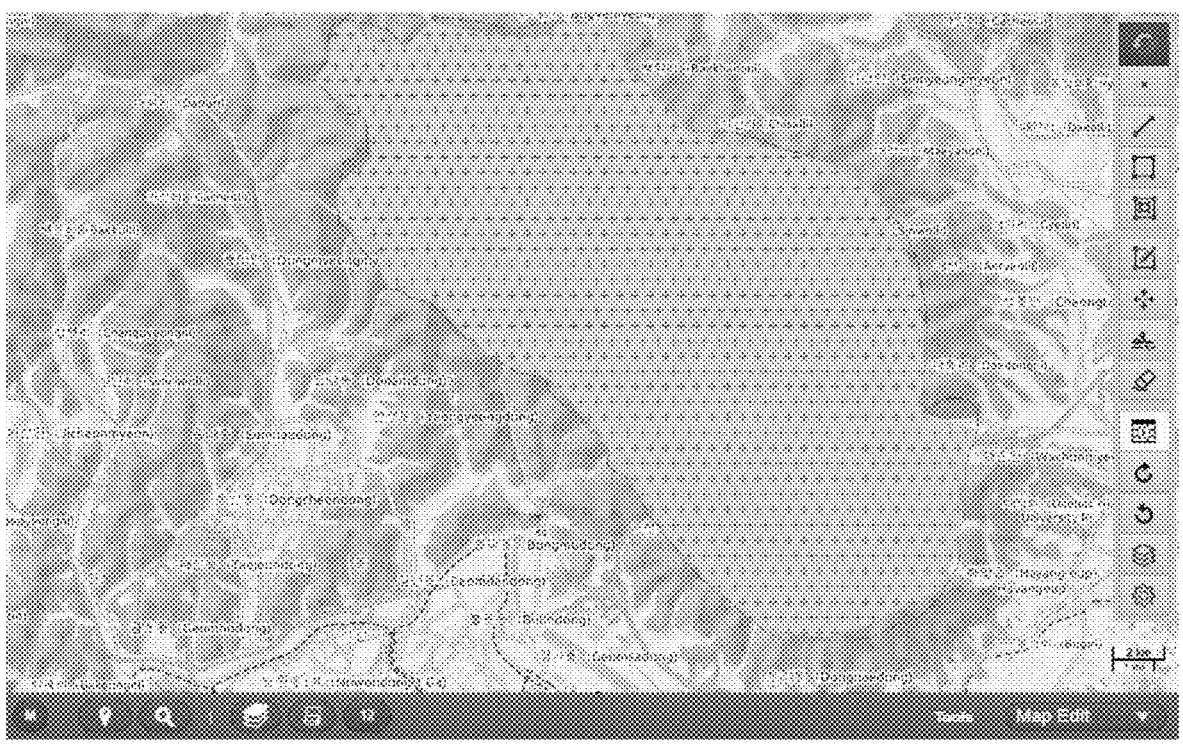
FIG. 8 illustrates symbols of a flow structure, inclined lineations, fold axes, ore deposits, and facilities.
Figure 9:
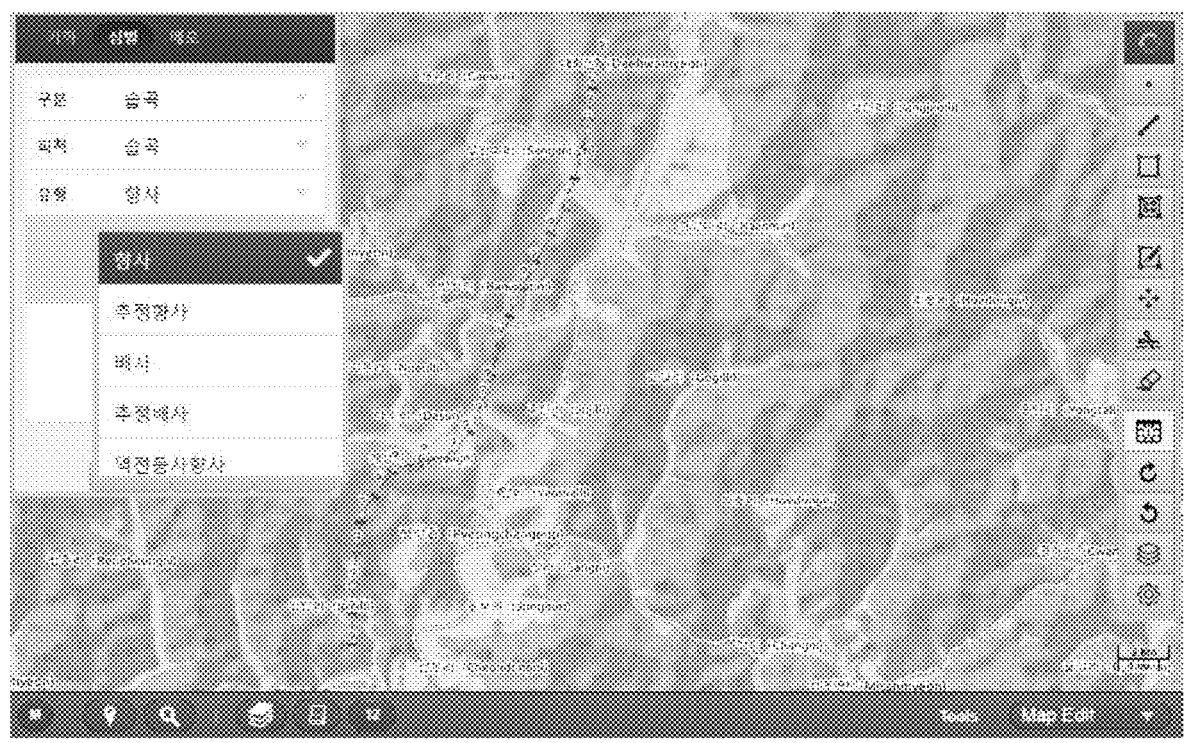
FIG. 9 illustrates symbols of mines, mineral springs, minerals, specimens, and location identifiers.

As illustrated in FIGS. 7-9, the point symbols are the symbols defined for an inclined bedding (see FIG. 7), an inclined joint (see FIG. 7), an inclined foliation (see FIG. 7), an inclined schistosity (see FIG. 7), a flow structure (See FIG. 8), an inclined lineation (See FIG. 8), a fold axis (See FIG. 8), an ore deposit (See FIG. 8), a facility (See FIG. 8), a mine (see FIG. 9), a mineral spring (see FIG. 9), minerals (see FIG. 9), a specimen (see FIG. 9), and a location identifier (see FIG. 9).

Figure 10:
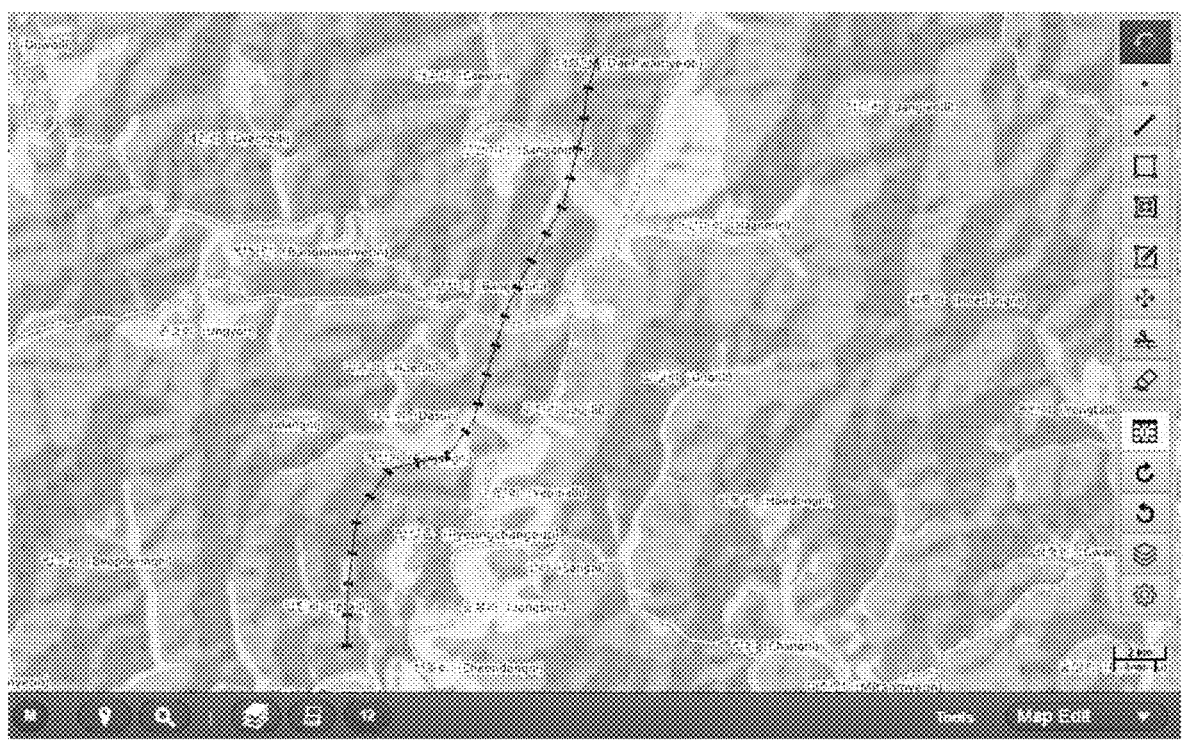
FIG. 10 illustrates symbols of boundary lines and faults.
Figure 11:
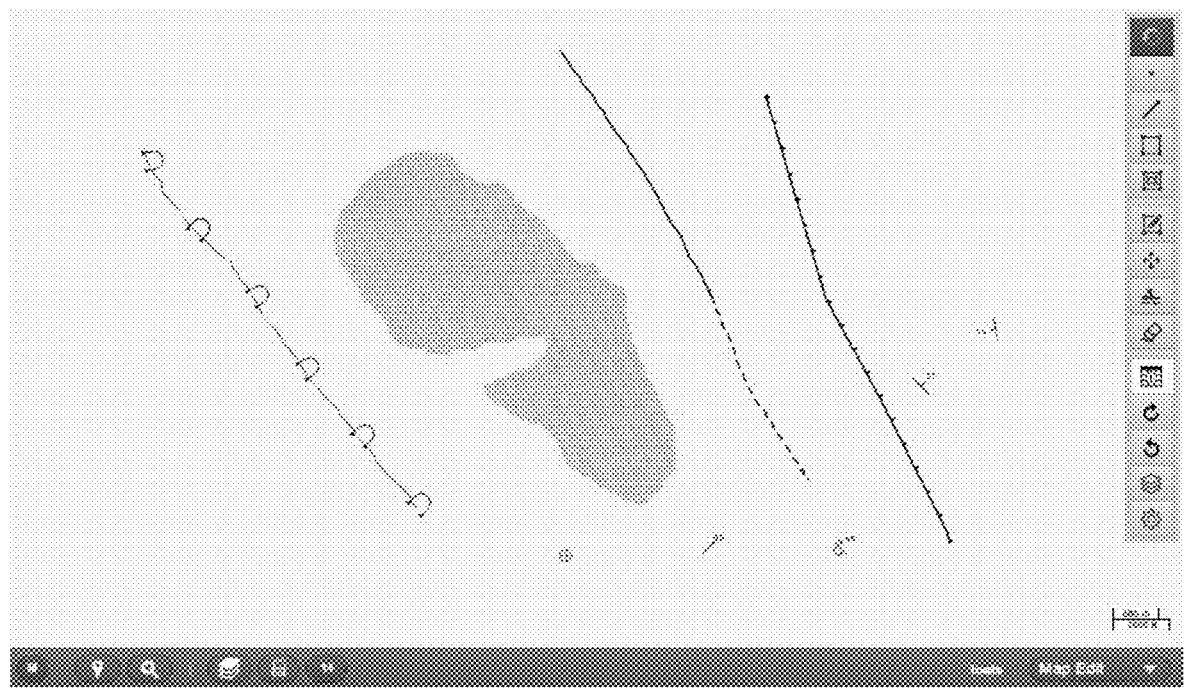
FIG. 11 illustrates symbols of folds.

As illustrated in FIGS. 10-11, the line symbols are the symbols defined for a boundary line (see FIG. 10), a fault (see FIG. 10), and a fold (see FIG. 11).

As illustrated in FIG. 12, the area symbols are the symbols defined for a metamorphic/alteration zone (see FIG. 12), an ore deposit (see FIG. 12), and the like.

The geographic information storage module 110 plays a role of storing the geographic information on the map. Meanwhile, the geographic information on a specific map is allowed to be read the controller 210 by the geological element edit module 220.

The geological element edit module 220 plays a role of providing functions, by the user's operation, of reading the geographic information on a specific map from the geographic information storage module 110, of reading the symbols from the geological symbol storage module 100, of rotating the point symbols, of connecting the line symbols to each other, of automatically transforming the line symbols to area symbols, of automatically creating outlines for the area symbols, and the like.

The GPS receiver 200 plays a role of receiving microwaves from GPS satellites, thereby generating current location information.

The controller 210 is a microcomputer playing a role of mapping point symbols, line symbols, and area symbols on the geographic information on the specific map read from the geographic information storage module 110 by an operation of the geological element edit module and of outputting the display control signals corresponding to the mapped symbols. Further, the controller 210 is allowed to display a current location of the apparatus for editing geological elements using a touch-based interface on the geographic information read from the geographic information storage module 110.

The display module 300 receives and displays the display control signal being input from the controller 210 and is formed with a touch panel thereon as an input device. In addition, the display module 300 is configured to have a bottom toolbar and a map edit menu screen.

As illustrated in FIG. 2A, the bottom toolbar includes a main menu button, a current location move button, a place name search button, a layer control button, a visible scale change menu button, and a toolbar button. The toolbar button includes a map move button (Move), a distance and area measurement button (Measure), a geology attribute display button (Geology Info), an outcrop survey button (Field Survey), and a map edit button (Map Edit).

The composition of the map edit menu screen includes basic edit functions such as inputting of geometric elements of points, lines, and areas; editing holes within an area element; editing geometric elements; moving; line cutting; erasing; and the like. In addition, buttons for undoing, redoing, edit layer displaying, and the like are provided as elements of a menu for applying a symbol to a geometric element and inputting attribute information on the map edit menu screen, and, along therewith, a toggle button is able to select several edited features and to perform functions such as deletion, object connection, and the like.

More specifically, the map edit menu screen is provided with: a changeover button for a multi-select menu; an input button for a geological structure (plane structure, line structure) and a geological element; an input button for a geological element having a line element such as a geological boundary, a fault, a fold, and the like; an input button for a geological element having an area element of a rock lithology and the alteration area; a button for hole creation in a polygon area; a modification button for a geometric element (points, lines, and areas); a button for feature moving; a button for line cutting; a button for erasing; an input and modification button for a feature attribute; a button for undoing; a button for redoing; an input-modification button for displaying an edit layer and a feature attribute; and a button for an edit setting (free hand, snapping).

The configuration of the input window of the outcrop information is allowed to include various kinds of information such as the outcrop location, the rock lithology, the geological structure measurement element, various information such as the sample and the like, a photographing result, and a sketch image (refer to FIG. 4). In addition, it is constituted to allow a plurality of measurement information to be input in one outcrop and is so configured that the location and the symbol corresponding thereto can be expressed for each individual measurement element. Further, the configuration of the input window of the outcrop information can be extended so that various information written in a field note is standardized, thereby being allowed to be input quantitatively.

In addition, the map edit menu is configured to allow the symbol and attribute information to be input for each geometric element (refer to FIG. 5). In the case of point elements, coordinates thereof are allowed to be modified directly or to be moved to the current location, and as for symbols, various symbols for a plane structure, a line structure, a mine location, and the like are allowed to be input. In the case of the line elements, the line elements are allowed to be transformed into area elements and are mainly used to express elements such as geological boundaries, faults, and folds. In the case of the line elements, when a symbol has the directionality, it is possible to change the direction thereof. In the case of area elements, the area elements are used to express regions such as a rock lithology and an ore body, and a rock lithology symbol is implemented to be dynamically expressed by a combination of a pattern, a pattern color, and a background color.

The communication module 310 allows the controller 210 to communicate with the server computer and an external network and to download data such as map data, geographic information, and the like of a specific area.

Hereinafter, the operation of the apparatus for editing geological elements using a touch-based interface according to an embodiment of the present invention configured as described above will be described.

Figure 6:
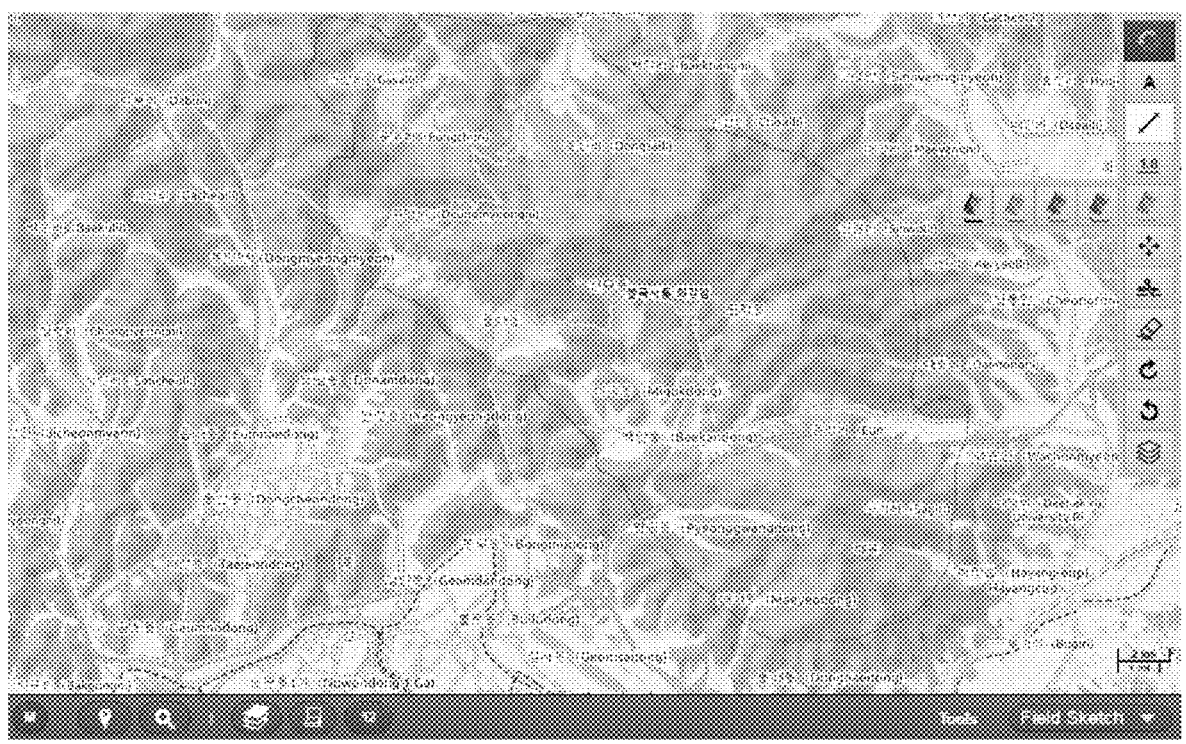

FIGS. 6A to 6H are views illustrating geological mapping using the apparatus for editing geological elements using a touch-based interface according to an embodiment of the present invention, wherein FIG. 6A shows a calculation of a distance and an area, FIG. 6B shows a legend for geological attributes, FIG. 6C shows a menu for a sketch (line color change and text input), FIG. 6D shows an input for plane structure-inclined bedding, FIG. 6E shows an application of a geological rock lithology pattern, FIG. 6F shows an input process for a fold-syncline fold, FIG. 6G shows a syncline fold symbol application, and FIG. 6H shows various symbol expressions.

The functions realized in the apparatus for editing geological elements of the present invention may be summarized such that development of advanced GIS edit technologies (Undo, Redo, Polyline ↔ Polygon (conversion), Freehand drawing, Snap editing, Polyline redirection, Hole in Polygon, etc.); development of technologies in symbol application and data processing for geological information collection; and functions of Geolocation are implemented using a touch-based interface.

The apparatus for editing geological elements using the touch-based interface according to an embodiment of the present invention is configured to include: a geological symbol storage module configured to store point symbols, line symbols, and area symbols defined for geometric elements of a point, a line, and an area; a geographic information storage module configured to store geographic information on a map; a geological element edit module configured to provide functions, by a user's operation, to read geological information on a specific map from the geological information storage module, to read symbols from the geological symbol storage module, to rotate the point symbols, to connect the line symbols to each other, to automatically transform the line symbols to area symbols, to automatically create outlines for the area symbols; a controller configured to map the symbols of the point, line, and area on the geographic information on the specific map read from the geographic information storage module by an operation of the geological element edit module 220 and to output the display control signals corresponding to the mapped symbols; and a display module receiving and displaying a display control signal being input from the controller and formed with a touch panel thereon. Accordingly, the present invention makes it possible to effectively express and edit geological elements expressed in various symbol systems in a touch-based interface of a smart device, thereby ultimately allowing the geological elements in the geological survey process to be collected and collected data to be edited in a map form.

Although exemplary embodiments have been disclosed and specific terms have been used in the drawings and the specification, it is evident that the same is by way of illustration and example only and is not to be viewed as limiting the meaning or the scope of the invention as defined by the appended claims. Therefore, those skilled in the art will appreciate that various modifications and equivalent embodiments are possible without departing from the scope of the present invention. Accordingly, the true scope of the present invention should be determined by the technical idea of the appended claims.

What is claimed is:

1. An apparatus for editing geological elements using a touch-based interface, the apparatus comprising:
    a geological symbol storage module configured to store point symbols, line symbols, and area symbols defined for a point, a line, and an area;
    a geographic information storage module configured to store geographic information on a map;
    a geological element edit module configured to provide functions, by a user's operation, of reading geological information on a specific map from the geographic information storage module, of reading symbols from the geological symbol storage module, of rotating the point symbols, of connecting the line symbols to each other, of automatically transforming the line symbols to the area symbols, of automatically creating outlines for the area symbols;
    a controller configured to map the point symbols, the line symbols, and the area symbols on the geographic information on the specific map read from the geographic information storage module by an operation of the geological element edit module and to output display control signals corresponding to the mapped symbols; and
    a display module receiving and displaying the display control signals being input from the controller and formed with a touch panel thereon,
    wherein the display module is provided with a map edit menu screen,
    wherein the display module is provided with a bottom toolbar,
    wherein the map edit menu screen provides
    an input button for a geological structure and a geological element;
    an input button for a geological element having a line element comprising at least one of a geological boundary, a fault, and a fold;
    an input button for a geological element having an area element of a rock lithology and an alteration area,
    a changeover button for a multi-select menu;
    a button for hole creation in a polygon area;
    a modification button for a geometric element;
    a button for feature moving;
    a button for line cutting;
    a button for erasing;
    an input and modification button for a feature attribute;
    a button for undoing;
    a button for redoing;
    an input-modification button for an edit layer display and a feature attribute; and
    a button for an edit setting.

2. The apparatus of claim 1, further comprising a GPS receiver receiving microwaves from a GPS satellite and generating current location information,
    wherein the controller displays a current location of the apparatus for editing geological elements using a touch-based interface on the geographic information read from the geographic information storage module.

3. The apparatus of claim 1, wherein the point symbols are the symbols defined for an inclined bedding, an inclined joint, an inclined foliation, an inclined schistosity, a cleavage, an inclined lineation, a fold axis, a fossil, a facility, a mine, a mineral spring, a specimen, an ore deposit, and a flow structure.

4. The apparatus of claim 1, wherein the line symbols are the symbols defined for a geological boundary line, a fault, and a fold.

5. The apparatus of claim 1, wherein the area symbols are the symbols defined for patterns of a metamorphic or alteration zone and an ore deposit.

6. The apparatus of claim 1, wherein the bottom toolbar includes a main menu button, a current location move button, a place name search button, a layer control button, a visible scale change menu button, and a toolbar button.

* * * * *